United States Patent
Gardner

(10) Patent No.: US 12,008,175 B2
(45) Date of Patent: Jun. 11, 2024

(54) EDITOR'S PEN PAD

(71) Applicant: Arian Gardner, Brooklyn, NY (US)

(72) Inventor: Arian Gardner, Brooklyn, NY (US)

( * ) Notice: Subject to any disclaimer, the term of this patent is extended or adjusted under 35 U.S.C. 154(b) by 24 days.

(21) Appl. No.: 17/827,714

(22) Filed: May 29, 2022

(65) Prior Publication Data

US 2022/0291761 A1 Sep. 15, 2022

Related U.S. Application Data

(63) Continuation of application No. 17/035,535, filed on Sep. 28, 2020, now Pat. No. 11,379,056.

(51) Int. Cl.
| | |
|---|---|
| G06F 3/048 | (2013.01) |
| G06F 3/0354 | (2013.01) |
| G06F 3/04883 | (2022.01) |
| H02J 7/00 | (2006.01) |

(52) U.S. Cl.
CPC ...... *G06F 3/03545* (2013.01); *G06F 3/04883* (2013.01); *H02J 7/0044* (2013.01)

(58) Field of Classification Search
CPC .. G06F 3/03545; G06F 3/04883; G06F 40/10; G06F 2200/1632; G06F 1/1626; G06F 1/1632; G06F 1/266; G06F 3/038; G06F 3/0383; H02J 7/0044
See application file for complete search history.

(56) References Cited

U.S. PATENT DOCUMENTS

| | | | |
|---|---|---|---|
| 8,139,049 B1* | 3/2012 | Brandon | G06F 3/03545 345/183 |
| 2009/0254802 A1* | 10/2009 | Campagna | G06F 40/114 709/204 |
| 2010/0153309 A1* | 6/2010 | Asano | G06F 3/03545 705/410 |
| 2015/0134352 A1* | 5/2015 | Strickland | G16H 10/60 705/2 |
| 2015/0146986 A1* | 5/2015 | Sugiura | G06V 30/32 382/189 |
| 2016/0313814 A1* | 10/2016 | Jacobs | G06F 21/32 |
| 2018/0299976 A1* | 10/2018 | Chiewcharnpipat | G06F 3/0346 |

* cited by examiner

*Primary Examiner* — Towfiq Elahi

(57) ABSTRACT

The embodiments disclose an electronic pen system, including an electronic pen having a digital writing nib to allow a user to create digital nib writing strokes and a microphone to record voice dictation data, an electronic pad wirelessly coupled to the electronic pen to receive the digital nib writing strokes, a scanning device coupled to the electronic pad to scan handwritten data and convert into editable text, a beacon coupled to the electronic pad and a computer with a plurality of writing styles and genre proofreading templates stored, a handwriting converter to covert nib writing strokes into editable text, a voice to text converter for converting dictation into editable text, and editing software installed on the electronic pen and coupled to the beacon to receive the plurality of writing styles and genre proofreading templates selectable by the user to allow editable text to be proofread.

19 Claims, 13 Drawing Sheets

_US 12,008,175 B2_

EDITOR'S PEN PAD

This Patent Application is a Continuation and claims priority to United States Patent Application entitled: "EDITOR'S PEN PAD", U.S. Ser. No. 17/035,535 filed on Sep. 28, 2020 filed by Arian Gardner, the U.S. Patent Application being incorporated herein by reference.

BACKGROUND

The present invention pertains to the sector of articles for the author's use. More specifically, the present invention pertains to an electronic editing writing device. Various devices are known for digital writing with accompanying tablets, however the present invention differs, in its advancement; this invention skillfully edits the manuscripts and varied writing documents via the electronic smart pen which skillfully houses professional editing software, with a direct link for publishing submission. The present invention pertains to an editing writing device. Across various technical, legal and business fields it is necessary to precisely draft a written or printed document for effective communication, to responsibly disseminate information, for profitable enterprise, etc. As well, it is the desired goal of the author to prepare the written work for publication.

FIELD OF THE INVENTION

Electric digital data processing including computer systems based on specific computational models.

BRIEF SUMMARY OF THE INVENTION

The present invention specifically relates to an electronic pen system, including an electronic pen having a digital writing nib configured to allow a user to create digital nib writing strokes and a microphone configured to record voice dictation data from the user, an electronic pad wirelessly to receive the digital nib writing strokes, a scanning device to scan handwritten documents to convert into editable text, a beacon coupled to the electronic pad and a computer, wherein the computer has a plurality of writing styles and genre proofreading templates stored therein, a handwriting converter to covert the digital nib writing strokes into editable text, and a voice to text converter to convert the voice dictation data into editable voice text, and editing software installed on the electronic pen and coupled to the beacon and to receive the plurality of writing styles and genre proofreading templates, wherein the writing styles and genre proofreading templates are selectable by the user to allow the editable text and the voice editable text to be proofread.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview

It should be noted that the descriptions that follow, for example, in terms of the editor's pen pad is described for illustrative purposes and the underlying system can apply to any number and multiple types writing styles. In one embodiment of the present invention, the editor's pen pad can be configured using editing software for a variety of writing styles. The editor's pen pad can be configured to include memory storage and can be configured to include a beacon pod using the present invention.

The terms editor's pen pad, editor's pen, electronic pen, and pen are used interchangeably herein without any change in meaning.

The terms editor's pen pad, electronic pad and pad are used interchangeably herein without any change in meaning.

Figure 1:
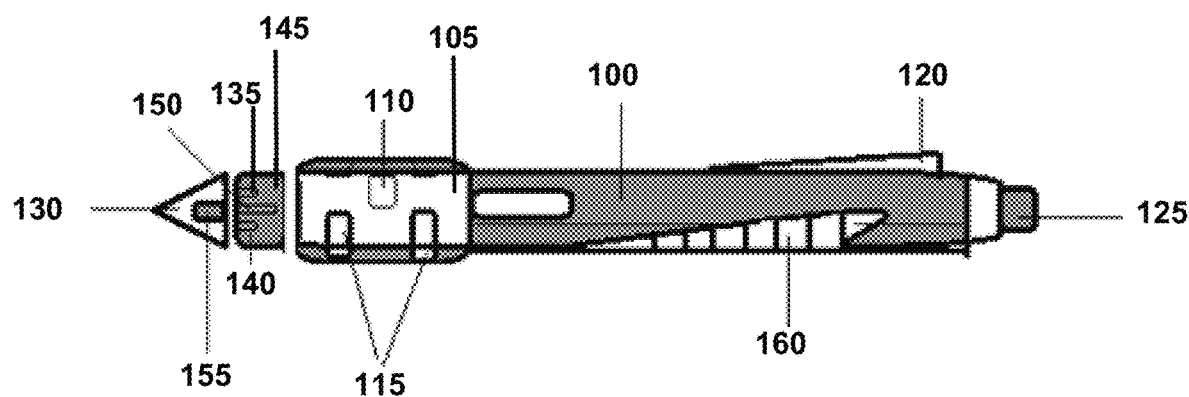
FIG. 1 shows for illustrative purposes only an example of an electronic pen of one embodiment.

FIG. 1 shows for illustrative purposes only an example of an electronic pen of one embodiment. FIG. 1 shows the pen 100. A smart pen that launches a built in editing software for a variety of writing styles, i.e. Novels, Business Proposals, Songwriting, News Writing, Poetry all ready to be sent to the publishers or client. With language translation compatibility all language and editing. Digitized, Sleek and Durable Writing pen Recordable-Storage capacity. Exclusive Write & Store Capability. As well as a scanning mode on the pen. The pen microphone, stylus, eraser and pen produce a professional manuscript for each writing style/genre.

The pen 100 includes components and features comprising pen shaft/charge and sync connector 105, pen input sync port (that launch off a editing software and downloads) 110, pen charging port(s) 115, pen record button 120, pen microphone 125, pen nib 130, pen nib/micro-scanner side left works in conjunction with 140 135, pen nib/micro-scanner side right works in conjunction with 135 140, pen nib base 145, pen nib and base connective bar 150, pen nib attachment 155, and pen cooling vent 160 of one embodiment.

DETAILED DESCRIPTION

Figure 2:
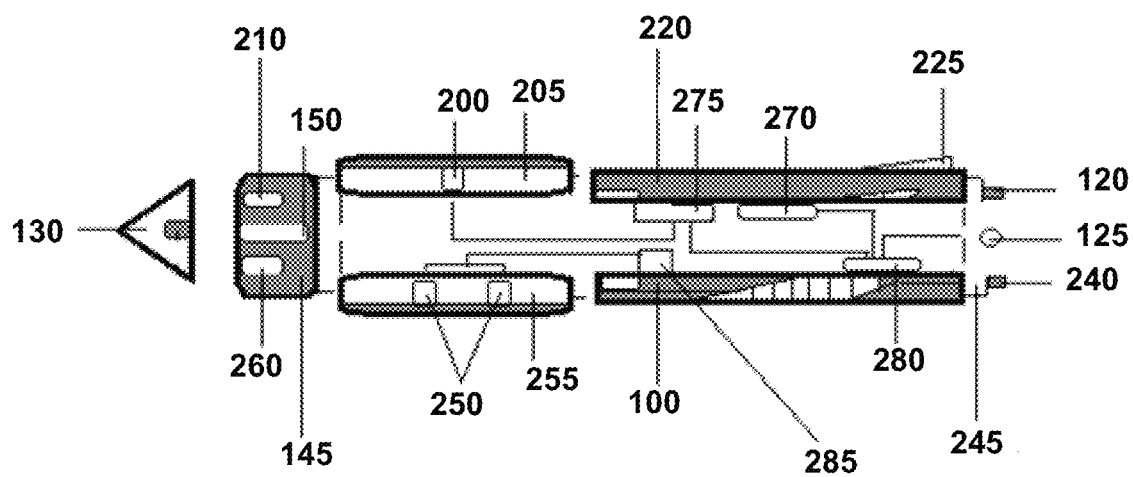
FIG. 2 shows for illustrative purposes only an example of the electronic pen internal view of one embodiment.

FIG. 2 shows for illustrative purposes only an example of the electronic pen internal view of one embodiment. FIG. 2 shows the electronic pen internal view showing the pen 100 includes components and features comprising a pen input sync port (professional editing software and downloads) 200, pen shaft (upper part of input sync port) 205, pen nib/micro-scanner side left 210, pen nib 130, pen upper and lower part(s) 220, pen microphone cover part a 225, pen microphone 125, pen nib base 145, pen microphone cover part b 240, pen microphone base 245, pen battery charging ports 250, pen shaft (lower part of input sync port) 255, pen nib/micro-scanner side right 260, pen record button 120, pen memory storage 270, pen professional editing software 275, pen CPU panel 280, pen rechargeable battery 285, and pen nib and base connective bar 150 of one embodiment.

Figure 3:
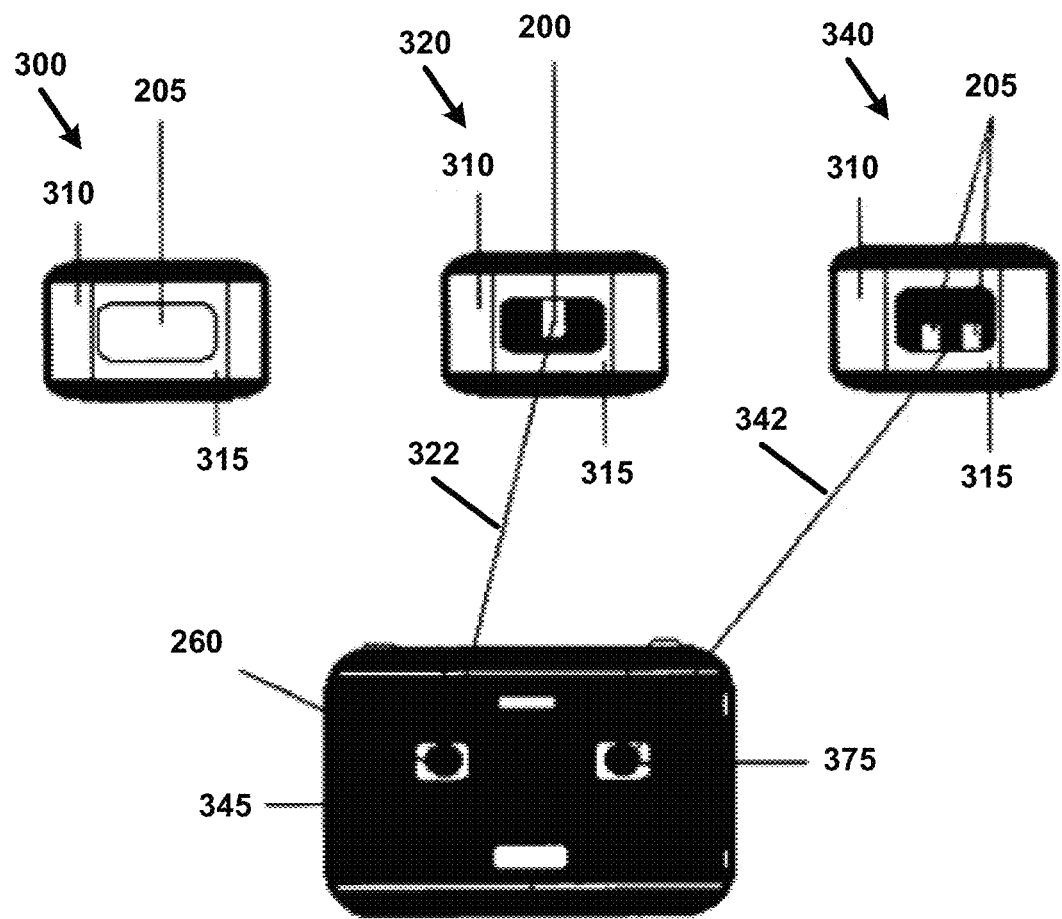
FIG. 3 shows for illustrative purposes only an example of a revolving pen shaft of one embodiment.

FIG. 3 shows for illustrative purposes only an example of a revolving pen shaft of one embodiment. FIG. 3 shows in a first view of a revolving pen shaft view 300 shown in a first view of an electronic pen shaft cover 310 including an electronic pen shaft 205 and an electronic pen shaft revolving mechanism 315. In a second view 320 FIG. 3 shows the electronic pen shaft 310 and electronic pen shaft revolving mechanism 315. The pen input sync port (professional editing software and downloads) 200 with a first wireless signal 322 to connect the editing software and downloads with the pen nib/micro-scanner side right 260. In a third view 340 is shown the electronic pen shaft 310 and electronic pen shaft revolving mechanism 315. The pen shaft 205 in proximity to an upper part of input sync port with a second wireless signal 342 to connect the pen shaft (upper part of input sync port) 205 to the pen pad beacon charger port connection 375. Also shown is a beacon charger 345 of one embodiment.

Figure 4:
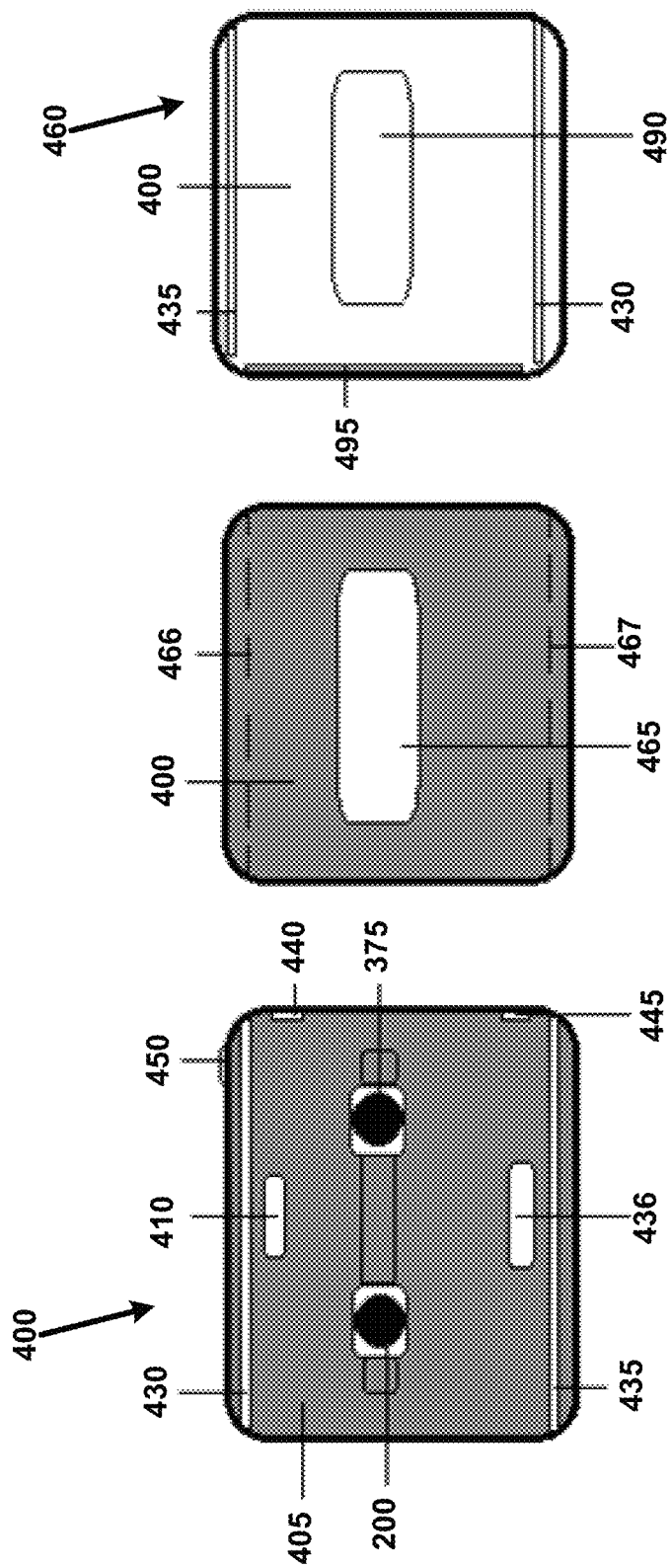
FIG. 4A shows for illustrative purposes only an example of a beacon in an overhead view of one embodiment.
FIG. 4B shows for illustrative purposes only an example of the beacon in an overhead/cover view of one embodiment.
FIG. 4C shows for illustrative purposes only an example of the beacon in an underside cover view of one embodiment.

FIG. 4A shows for illustrative purposes only an example of a beacon in an overhead view of one embodiment. FIG. 4A shows a beacon cover 400 in an overhead view. The beacon is the device's hard drive/charger; and operates as a multi-functional source. The beacon is equipped with built-in speakers, interactive voice automation/speech dictation. Duo/input hands-free chargeable/docking station: one side allows for re-charging the pen (and its microphone/speaker), with exact tone- and range potential. The other side syncs and uploads documents, provides document removal: all in preparation for professional editing and direct-to-publisher or client. Wireless multi-functional hub/port for convenience.

The beacon 405 includes a beacon status bar 410, beacon power button 436, a pen input sync port for professional editing and downloads 200, a beacon charging port 375, beacon cover track (left side view) 430, beacon cover track (right side view) 435, beacon cover stop (right side view) 440, beacon cover stop left side view 445, and beacon charger release button 450 of one embodiment.

FIG. 4B shows for illustrative purposes only an example of the beacon in an overhead/cover view of one embodiment. FIG. 4B shows a beacon cover 400. The beacon cover 400 includes a beacon cover illuminated logo 465. Also shown are a first pen rechargeable battery 466 and a second pen rechargeable battery 467 of one embodiment.

FIG. 4C shows for illustrative purposes only an example of the beacon in an underside cover view of one embodiment. FIG. 4C shows the beacon in an underside cover view 460. The beacon in an underside cover view 460 shows a beacon cover 400, beacon cover track (right side view) 435, beacon cover track (left side view) 430, beacon logo (illuminated) mechanism panel 490, and beacon cover stop bar 495 of one embodiment.

Figure 5:
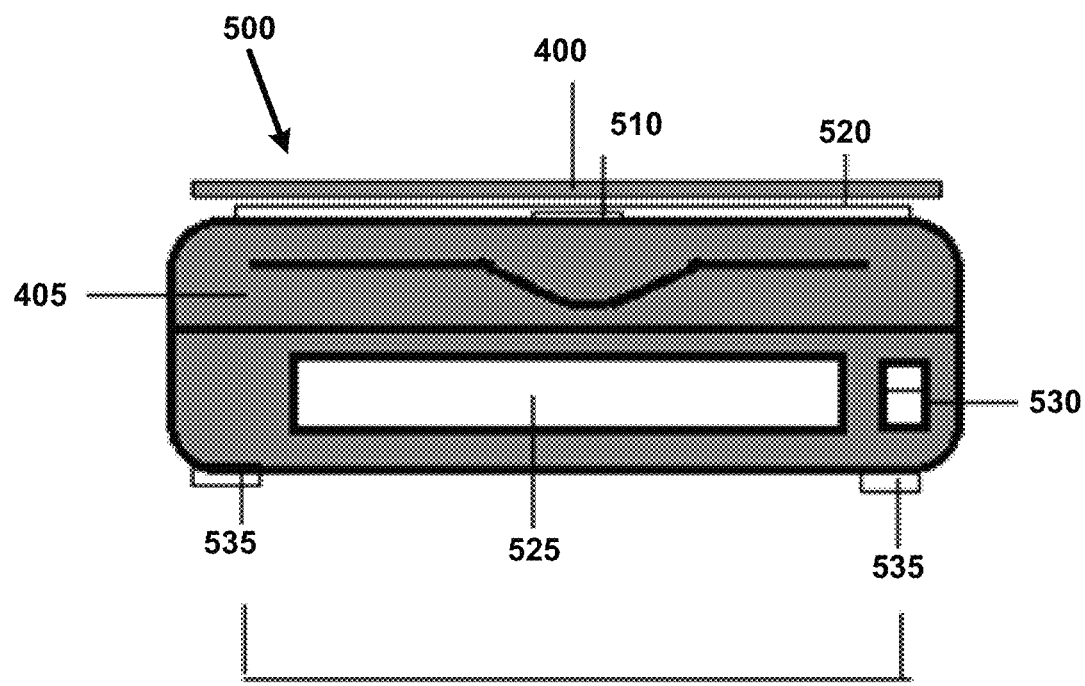
FIG. 5 shows for illustrative purposes only an example of a beacon charger in a front view of one embodiment.

FIG. 5 shows for illustrative purposes only an example of a beacon charger in a front view of one embodiment. FIG. 5 shows a beacon front view 500. The beacon front view 500 illustrates the beacon 405 including a beacon power on/off 510, beacon cover 400, beacon cover track 520, beacon speaker 525, beacon volume button 530, and beacon pod located on the left and right sides 535 of one embodiment.

Figure 6:
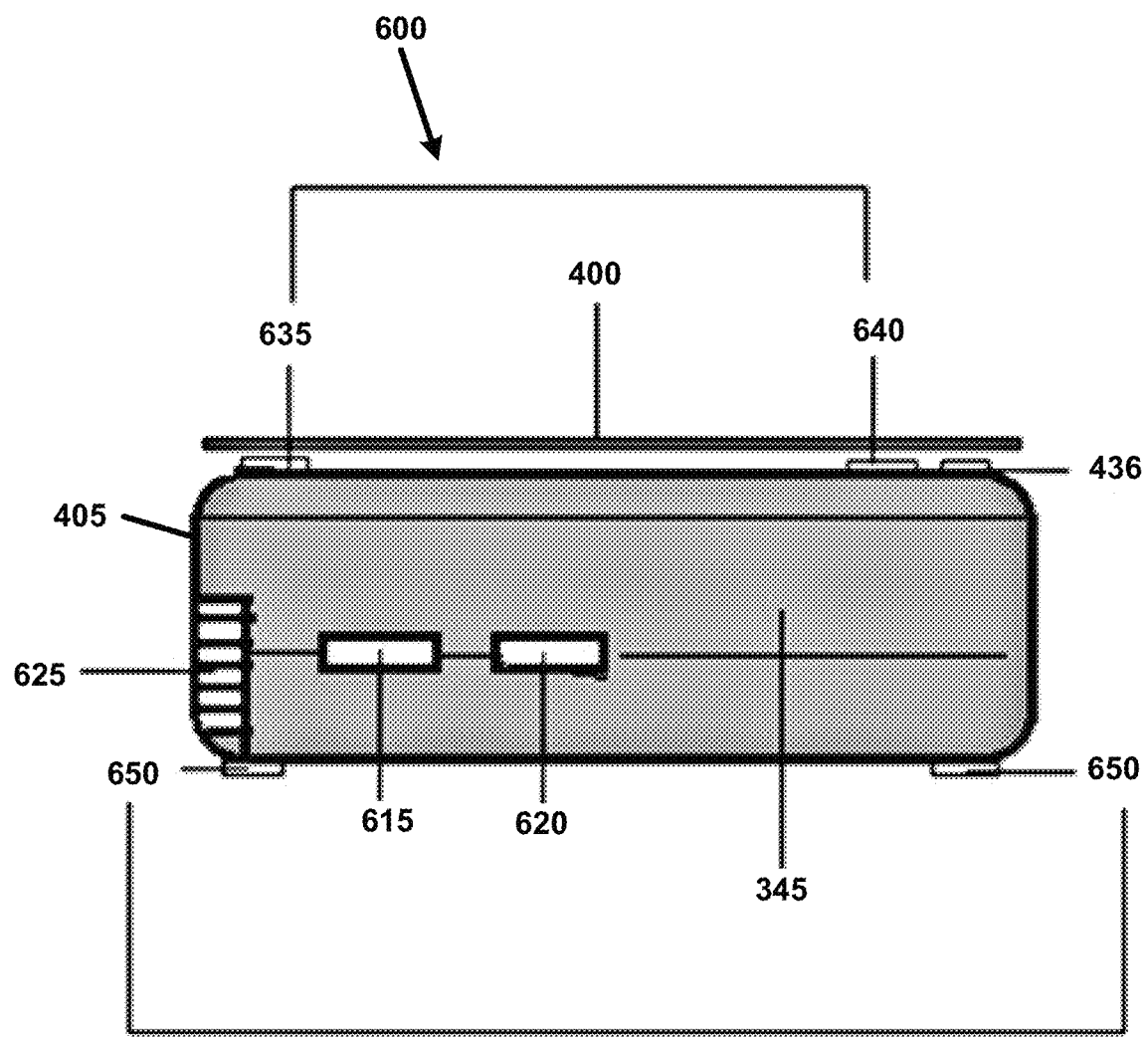
FIG. 6 shows for illustrative purposes only an example of the beacon in a left side view of one embodiment.

FIG. 6 shows for illustrative purposes only an example of the beacon in a left side view of one embodiment. FIG. 6 shows the beacon in a left side view 600. In this view the beacon 405 is showing a beacon charger 345, beacon power button 436, beacon connector plug for pad 615, beacon USB port (i.e., exclusive for external drives) 620, beacon cooling fan 625, beacon cover 400, beacon track (left side) 635, and beacon track (right side) 640 of one embodiment.

Figure 7:
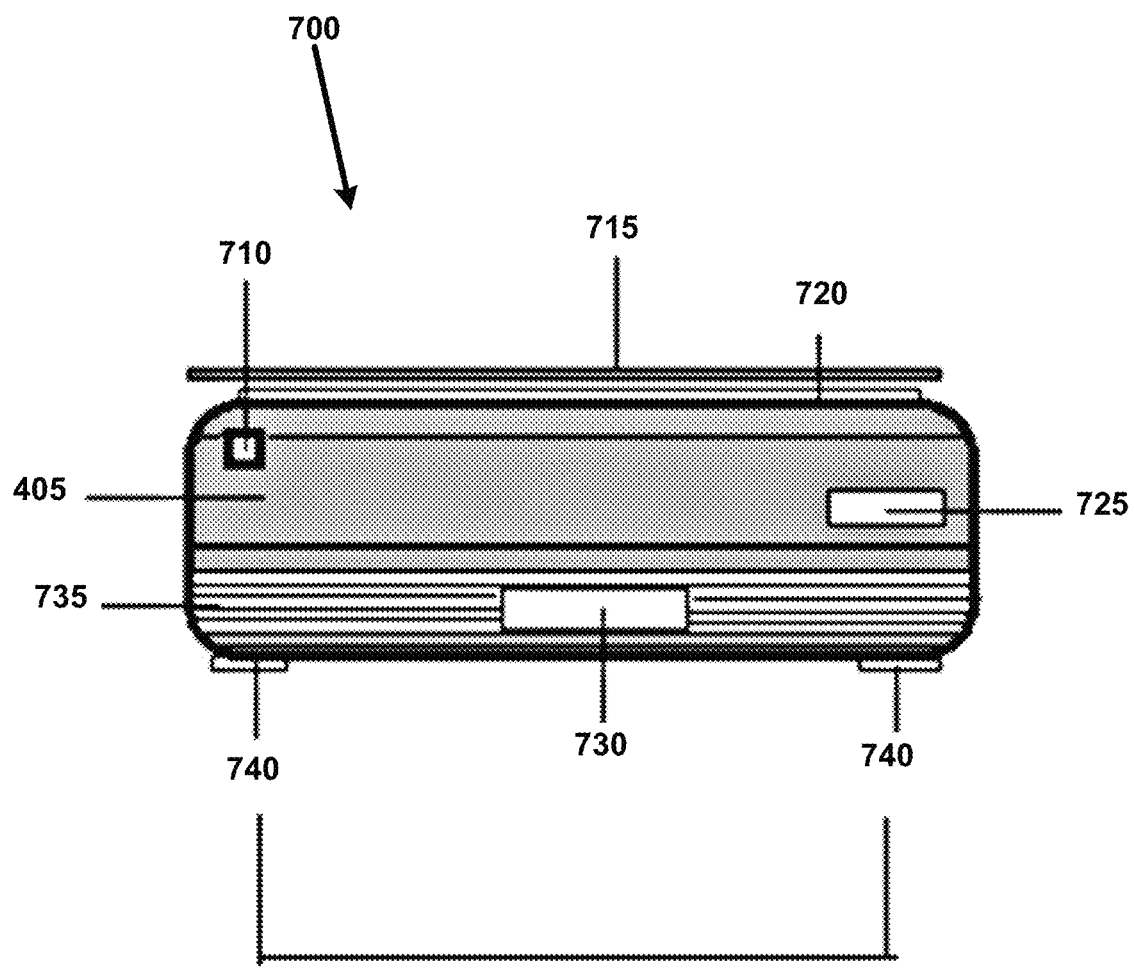
FIG. 7 shows for illustrative purposes only an example of a beacon in a back view of one embodiment.

FIG. 7 shows for illustrative purposes only an example of a beacon in a back view of one embodiment. FIG. 7 shows a beacon back view 700 is showing the beacon 405, a beacon cover release button 710, beacon cover door 715, beacon track 720, beacon USB power cord/port 725, beacon/cooling fan 730, beacon vent(s) 735, and beacon pod (left side) (right side 740 one embodiment.

Figure 8:
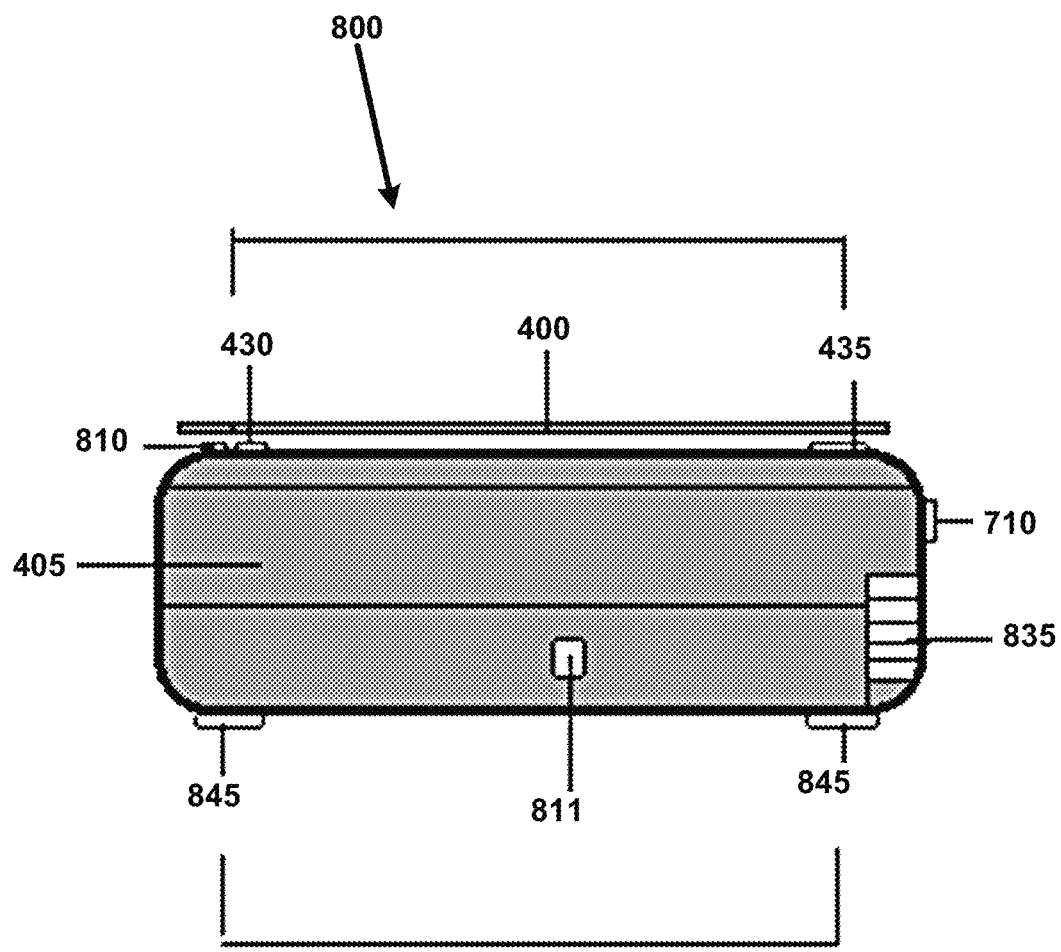
FIG. 8 shows for illustrative purposes only an example of a beacon in a right side view of one embodiment.

FIG. 8 shows for illustrative purposes only an example of a beacon in a right side view of one embodiment. FIG. 8 shows the beacon in a right side view 800 illustrating the beacon 405, beacon power off/on 810, beacon headphone port 811, beacon cover 400, beacon cover track (right side view) 435, beacon cover track (left side view) 430, beacon cooling vent 835, beacon cover release button 710, and beacon pods 845 of one embodiment.

Figure 9:
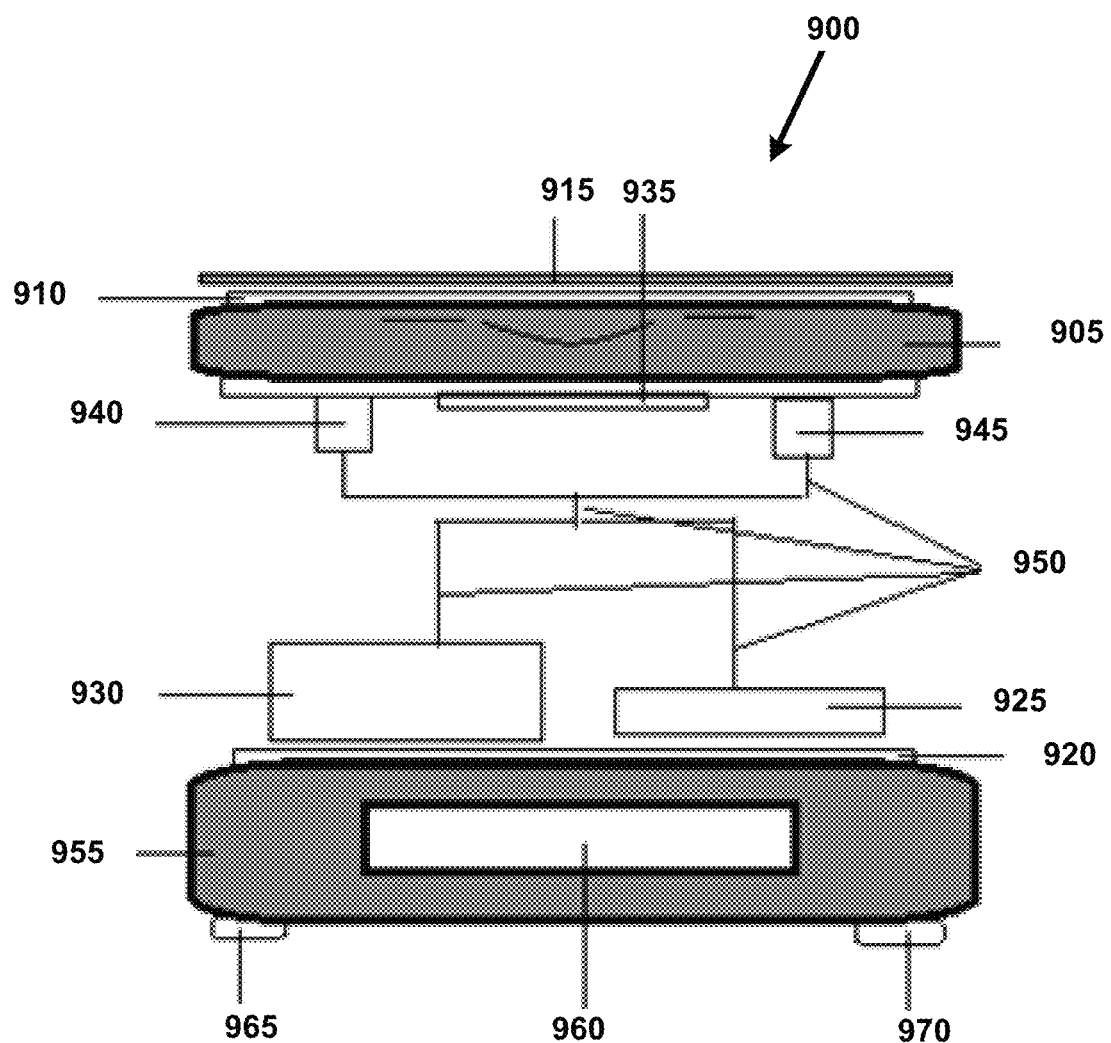
FIG. 9 shows for illustrative purposes only an example of a beacon charger internal view of one embodiment.

FIG. 9 shows for illustrative purposes only an example of a beacon charger internal view of one embodiment. FIG. 9 shows a beacon charger internal view 900 that shows a beacon charger top part 905, beacon charger cover track 910, beacon charger cover 915, beacon charger base for hard drive and CPU panel 920, beacon microchip panel 925, hard drive 930, beacon charger cooling fan 935, beacon charger sync 940, beacon charger port 945, beacon charger operation connection wires 950, beacon charger bottom part 955, beacon charger speakers 960, beacon charger pod a 965, and beacon charger pod b 970 of one embodiment.

Figure 10:
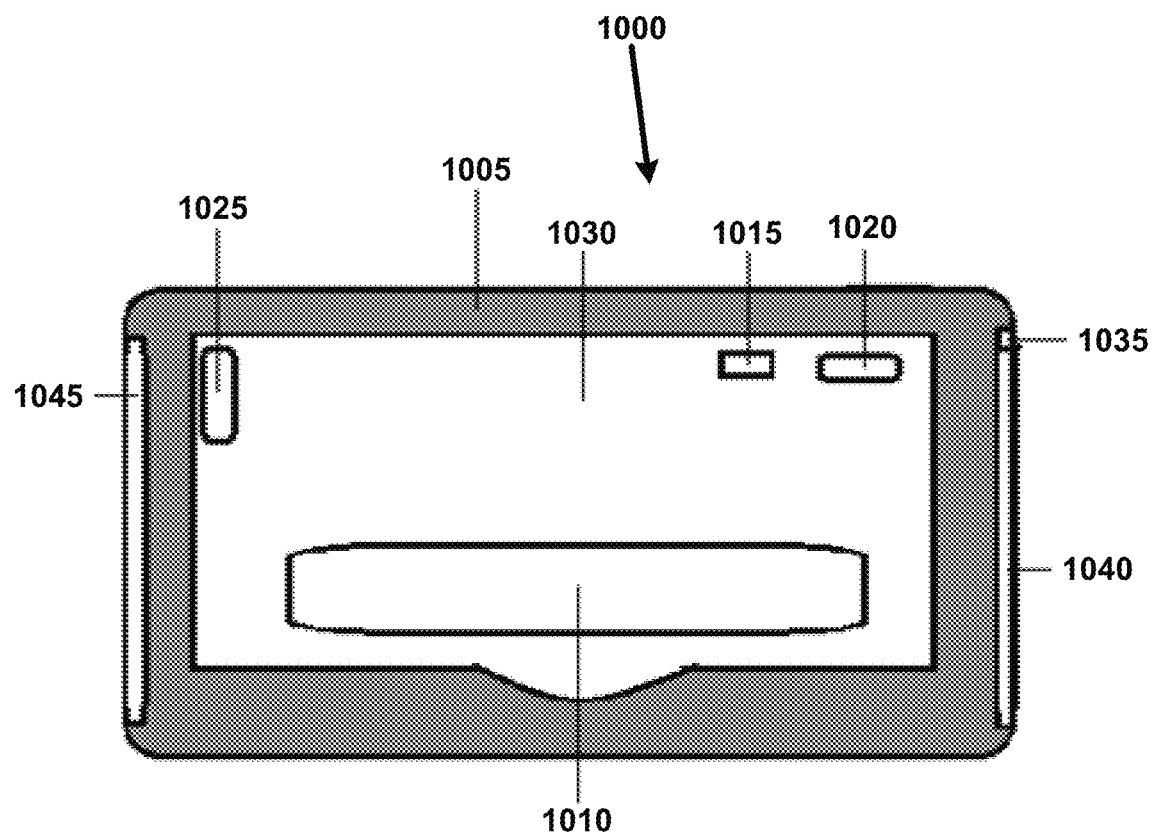
FIG. 10 shows for illustrative purposes only an example of an electronic pad of one embodiment.

FIG. 10 shows for illustrative purposes only an example of an electronic pad of one embodiment. FIG. 10 shows an electronic pad application plays an integral role in the electronic pen pad; housing the library within the pen. Inside the applications' library is the genre or category of choice: novels, songwriting, manuscript preparation, business proposals, legal documentation, poetry, public relations, news and screenwriting, personal journaling, etc. The pad application also comes with storage for projects. The pad application storage allows documents to save on various devices, i.e., mobile phone, laptop, and tablets.

Scanning Mode

Pad scans older documents, direct-to beacon/pen to be professionally edited in preparation for publishing houses or clients. Voice command allows voice dictation direct-to-beacon/pen navigation, for example access to the pad Library within various genres and or categories. Writing on pad uses pen for digitized writing use exclusively. Keyboarding capabilities this mode offers a vintage "Royal Style" typewriter keyboard for nostalgic (sound-effect) writing.

The pad 1000 view shows the electronic pad 1005, electronic pad digital keyboard (power activated) 1010, electronic pad wi-fi status bar (power activated) 1015, electronic pad word count view (power activated) 1020, electronic pad volume level when you speak in to the pen (power activated) 1025, electronic pad screen to write on 1030, electronic pad USB power cord port 1035, electronic pad scan/input feed 1040, and electronic pad scan/output feed 1045 of one embodiment.

Figure 11:
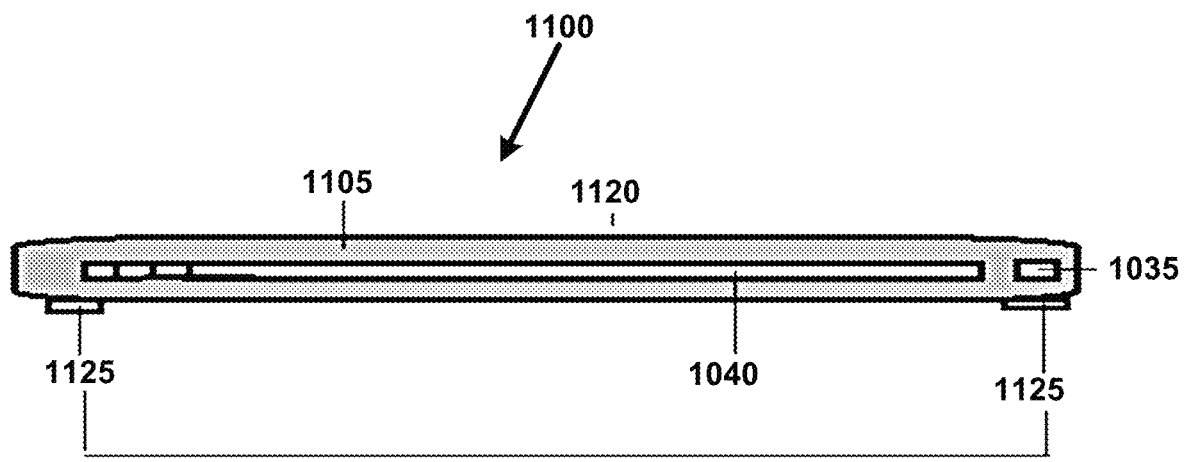
FIG. 11 shows for illustrative purposes only an example of an electronic pad in a right side view of one embodiment.

FIG. 11 shows for illustrative purposes only an example of an electronic pad in a right side view of one embodiment. FIG. 11 shows a pad scan mode allows it to scan your past books that you wrote into the Pad and app storage. Now it's ready to perform professional editing when u ready. Save a lot more time scanning then writing it over. The Pad comes with one charging dock that fits your style of comfort. The pad in a right side view 1100 shows an electronic pad 1105, electronic pad scan/input feed 1040, electronic pad USB power cord port 1035, electronic pad screen 1120, and electronic pad pods 1125 of one embodiment.

Figure 12:
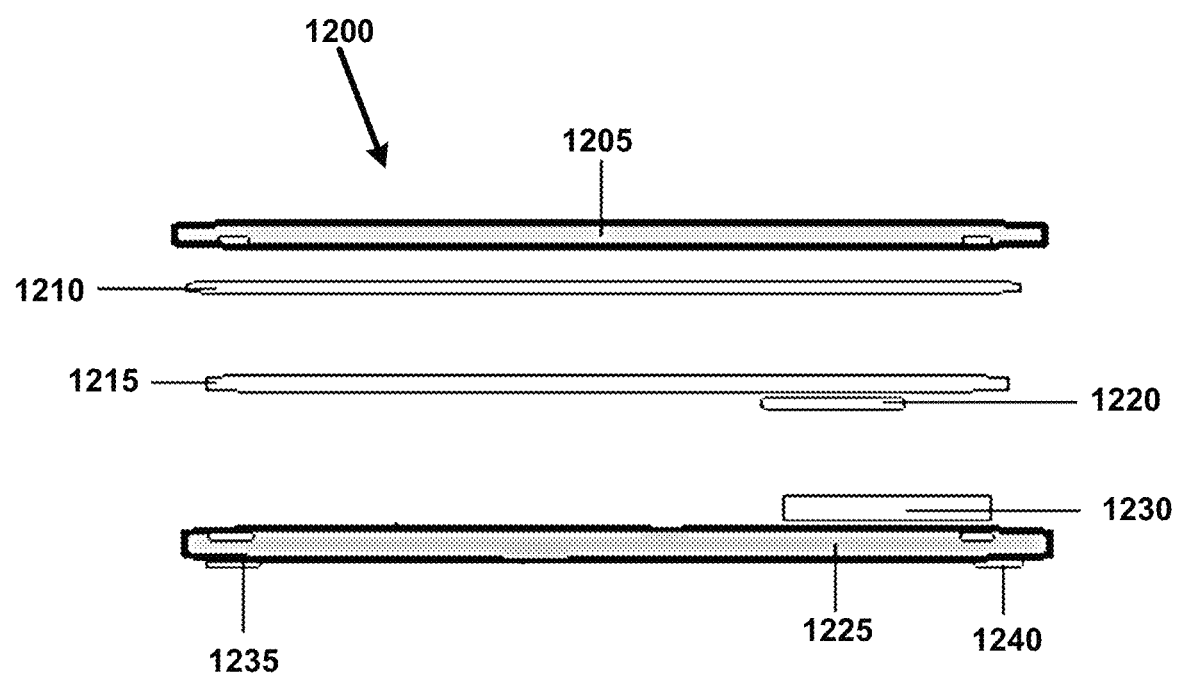
FIG. 12 shows for illustrative purposes only an example of an electronic pad internal view of one embodiment.

FIG. 12 shows for illustrative purposes only an example of an electronic pad internal view of one embodiment. FIG. 12 shows an electronic pad internal view 1200. The electronic pad internal view 1200 shows an electronic pad top part 1205, electronic pad scanning panel 1210, electronic pad input/output feed base 1215, electronic pad cooling fan 1220, electronic pad bottom part 1225, electronic pad hard drive and CPU panel 1230, electronic pad pod a 1235, and electronic pad pod b 1240 of one embodiment.

Figure 13:
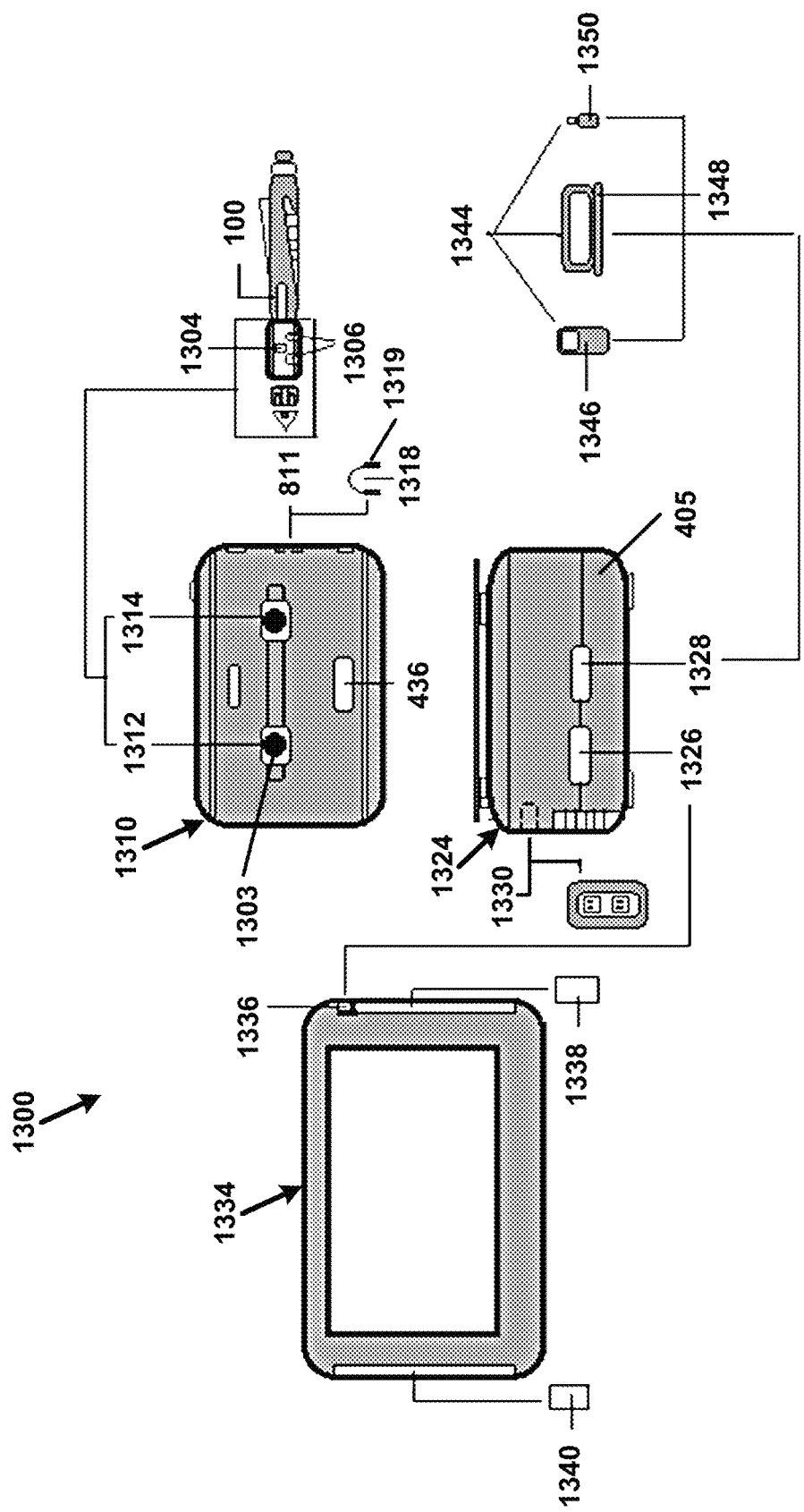
FIG. 13 shows for illustrative purposes only an example of an electronic pen, a beacon, and electronic pad connections of one embodiment.

FIG. 13 shows for illustrative purposes only an example of an electronic pen, a beacon, and electronic pad connections of one embodiment. FIG. 13 shows how the pen and pad works with the beacon. The beacon (automated voice interaction) or the 'source', which is stored in the pen itself and allows the pad to store all written, typed, scanned or transcribed (via voice command) documents direct-to-device . . . . The beacon operates as a multifunctional source, allowing documents sync/upload/removal and chargeable power source . . . . Each task-in-progress will show its status; working expressly in conjunction with The pen beacon and pad . . . an AG Portfolio will be automatically prepared and accompany all finalized works.

Showing is the pen, beacon, and pad connections 1300. The connections include the electronic pen 100; beacon syncing port 1303 connects to the beacon 405 to activate the professional editing software 1304. The beacon port connects to the beacon charger port 945 of FIG. 9 to activate battery charging 1306 as showing in the beacon in an overhead view 1310.

A beacon syncing port 1303 connects to the electronic pen 100 into the professional editing software 1304 to activate the professional editing software 1312. FIG. 13 is also showing the beacon charger port connects to the electronic pen 100 into a beacon headphone port 811 to activate battery charging 1314, also a beacon headphone port 811 and headphones 1319 connects to the beacon 1318, beacon power button 436, beacon left side view 1324, beacon USB port connects to the electronic pad 1105 of FIG. 11 into 1336 to power on pad 1326, USB external drive port/document retrieval and sync 1328, beacon USB power cord/port allow the beacon and pad to power on 1330, pad in an overhead view 1334, USB port for the beacon attachment 1336 connection 1326 to power on the electronic pad 1105 of FIG. 11. An electronic pad scan/input feed to receive document for scan 1338, electronic pad scan/output feed to generate completed scanned document 1340, external devices connectable to 1344, mobile phone allow to upload 1346, laptop PC allow to upload 1348, and USB flash drive allow to upload 1350 of one embodiment.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

The invention claimed is:

1. An electronic writing and editing apparatus, comprising:
   an electronic pen having an integrated digital writing nib configured to allow a user to create digital nib writing strokes;
   an electronic pad with a screen, the electronic pad being electronically connected to the electronic pen and configured to digitally receive and record the writing strokes;
   wherein the electronic pad is coupled to a smart phone having a display screen configured to allow a user to make writing strokes on the smart phone display screen to enter manuscript materials for conversion to editable text for professional proofreading, wherein the smart phone has a camera coupled to an internal scanning application configured to scan documents;
   a document scanner integrated into the electronic pad and configured to scan documents and convert content on the document into digital data;
   a dock for removable and electronically connecting to the electronic pen, the dock being electronically connected to the electronic pad and a server;
   a server module operating on the server and configured to receive and convert the writing strokes and the digital document data into editable text, wherein the server module has a plurality of professional writing styles and genre proofreading templates stored therein; and
   an editing processor integrated into the electronic pen and configured to receive the editable text and the plurality of professional writing styles and genre proofreading templates, wherein the plurality of professional writing styles and genre proofreading templates are selectable by the user to allow the editable text to be proofread and edited on the screen by the user.

2. The electronic writing and editing apparatus of claim 1, wherein the electronic pad includes a digital library of user selectable templates for proofreading, an integrated self-reporting system configured to allow identification, management and reporting of use of the electronic pad and a save component configured to allow users to save editing of the editable text for a future use.

3. The electronic writing and editing apparatus of claim 1, further comprising software with language translation compatibility in a plurality of languages and editing styles stored in the electronic pad.

4. The electronic writing and editing apparatus of claim 1, further comprising an integrated microphone configured to allow a writer to speak into an integrated microphone of the electronic pen for recording voice dictation data for editing.

5. The electronic writing and editing apparatus of claim 1, further comprising a wireless transmitter configured to allow the electronic pen to wirelessly connect to the dock.

6. The electronic writing and editing apparatus of claim 1, further comprising an integrated electronic pen micro-scanner configured to allow a user to scan documents directly from the electronic pen.

7. The electronic writing and editing apparatus of claim 1, further comprising a wireless transmitter configured to allow the electronic pen to wirelessly connect directly to the server.

8. The electronic writing and editing apparatus of claim 1, further comprising an integrated electronic pad digital keyboard configured to allow a user to type on the pad to enter manuscript materials for professional proofreading.

9. The electronic writing and editing apparatus of claim 1, further comprising an integrated electronic pad scan/input feed configured to allow a writer to scan documents on the pad for conversion into editable text.

10. An electronic writing and editing apparatus, comprising:
an electronic pen having a voice data recorder and an integrated digital writing nib configured to allow a user to create digital nib writing strokes;
an electronic pad with a screen, the electronic pad being electronically connected to the electronic pen and configured to digitally receive and record the writing strokes;
wherein the electronic pad is coupled to a smart phone having a display screen configured to allow a user to make writing strokes on the smart phone display screen to enter manuscript materials for conversion to editable text for professional proofreading, wherein the smart phone has a camera coupled to an internal scanning application configured to scan documents;
a document scanner integrated into the electronic pad and configured to scan documents and convert content on the document into digital data;
a dock for removably and electronically connecting to the electronic pen, the dock being electronically connected to the electronic pad and a server;
a server module operating on the server and configured to receive and convert the voice data into voice editable text, and the writing strokes and the digital document data into editable text, wherein the server module has a plurality of professional writing styles and genre proofreading templates stored therein; and
an editing processor integrated into the electronic pen and configured to receive the voice editable text, the editable text, and the plurality of professional writing styles and genre proofreading templates, wherein the plurality of professional writing styles and genre proofreading templates are selectable by the user to allow the editable text and the voice editable text to be proofread and edited on the electronic pad screen by the user.

11. The electronic editing apparatus of claim 10, wherein the electronic pad screen is configured to allow the to write on the pad screen for conversion to the editable text.

12. The electronic editing apparatus of claim 10, further comprising an electronic pad integrated digital keyboard configured to allow the user to type on the pad to enter the editable text.

13. The electronic editing apparatus of claim 10, wherein the professional writing styles and genre proofreading templates are selectable by the user to allow the voice editable text to be proofread by the professional writing styles and genre proofreading templates.

14. The electronic editing apparatus of claim 10, wherein the dock further comprises an integrated beacon port connection configured to activate battery charging of the electronic pen, electronic pad, and integrated and interconnected modules.

15. An electronic editing apparatus, comprising:
an electronic pen having an integrated digital writing nib configured to allow a user to create digital nib writing strokes;
an electronic pad with a screen, the electronic pad being electronically connected to the electronic pen and configured to digitally receive and record the writing strokes;
wherein the electronic pad is a smart phone having a display screen configured to allow a user to make writing strokes on the smart phone display screen to enter manuscript materials for conversion to editable text for professional proofreading, wherein the smart phone has a camera coupled to an internal scanning application configured to scan documents;
a dock for removably and electronically connecting to the electronic pen, the dock being electronically connected to the electronic pad and a server;
a server module operating on the server and configured to receive and convert the editable text, and the writing strokes and the digital document data into editable text, wherein the server module has a plurality of professional writing styles and genre proofreading templates stored therein; and
an editing processor integrated into the electronic pen and configured to receive the editable text, and the plurality of professional writing styles and genre proofreading templates, wherein the plurality of professional writing styles and genre proofreading templates are selectable by the user to allow the editable text to be proofread and edited on the electronic pad screen by the user.

16. The electronic editing apparatus of claim 15, further comprising a USB external drive port integrated into the dock and configured to connect external modules.

17. The electronic editing apparatus of claim 15, wherein the dock is further configured for powering battery charging for the electronic pen and electronic pad and providing interconnections for interactions between the electronic pen and electronic pad.

18. The electronic editing apparatus of claim 15, wherein the electronic pad screen is configured to allow the user to write on the screen with the electronic pen to enter handwritten manuscript materials with the writing strokes.

19. The electronic editing apparatus of claim 15, further comprising an electronic pad integrated digital keyboard configured to allow a writer to type on the pad to enter editable text for professional proofreading.

* * * * *